July 4, 1950        J. G. KERR        2,514,077
FANFOLD MANIFOLDING DEVICE
Filed Oct. 15, 1945        6 Sheets-Sheet 1
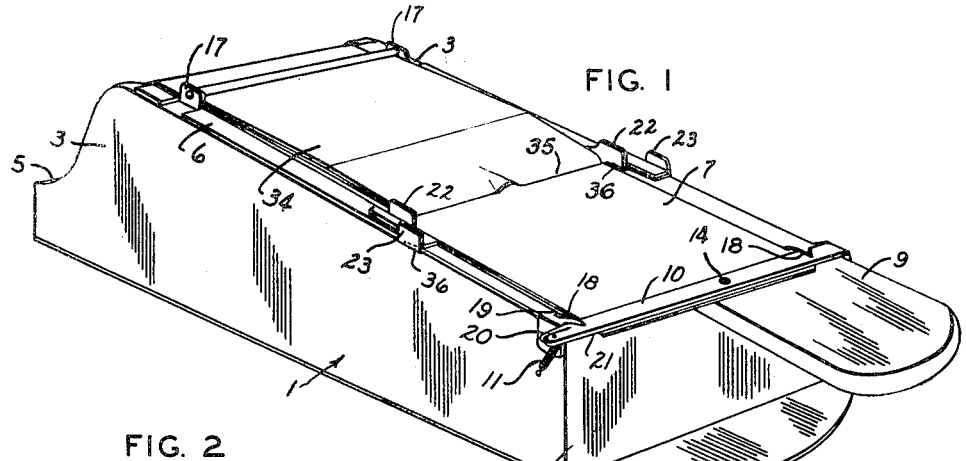
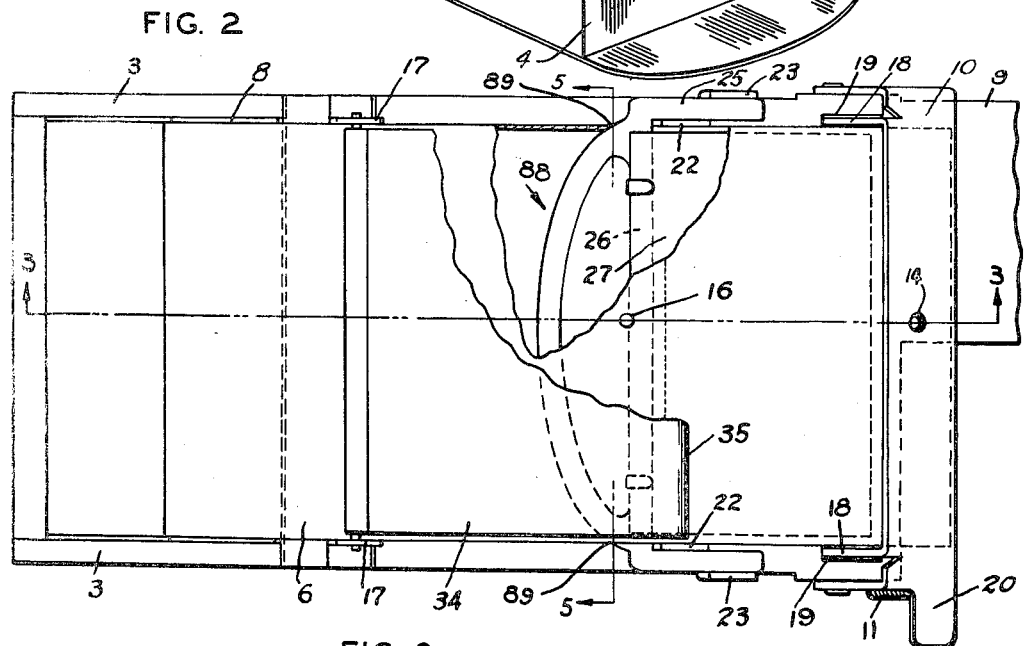
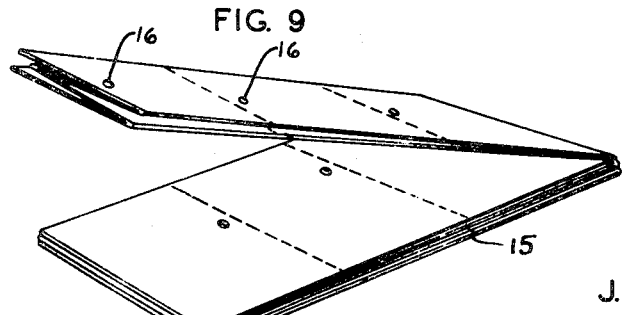
Inventor
J. G. KERR
By Mason Fenwick & Lawrence
Attorneys

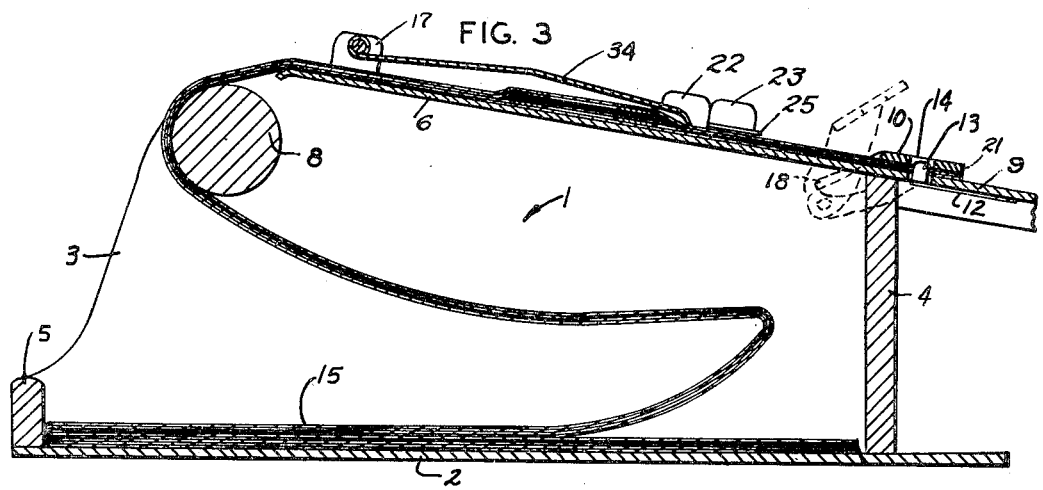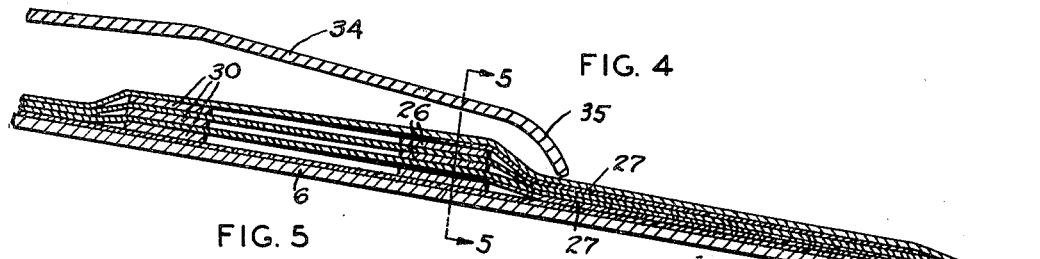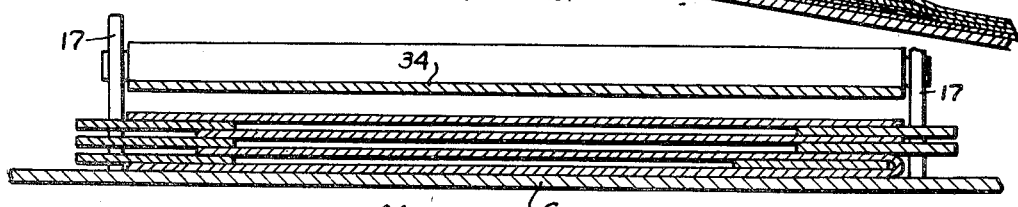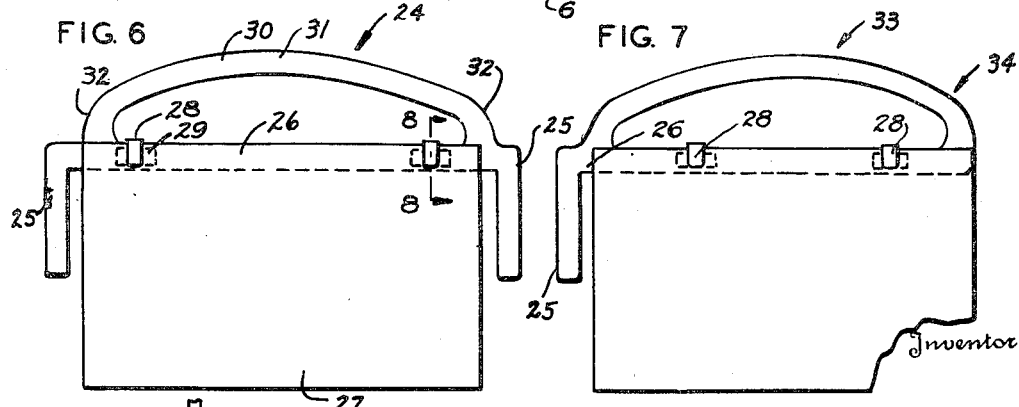

July 4, 1950            J. G. KERR            2,514,077
FANFOLD MANIFOLDING DEVICE
Filed Oct. 15, 1945            6 Sheets-Sheet 3
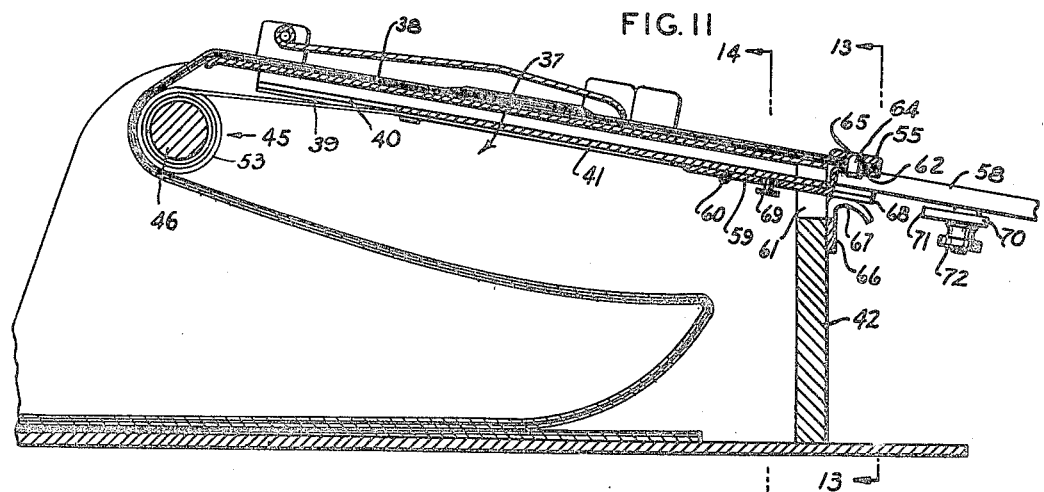
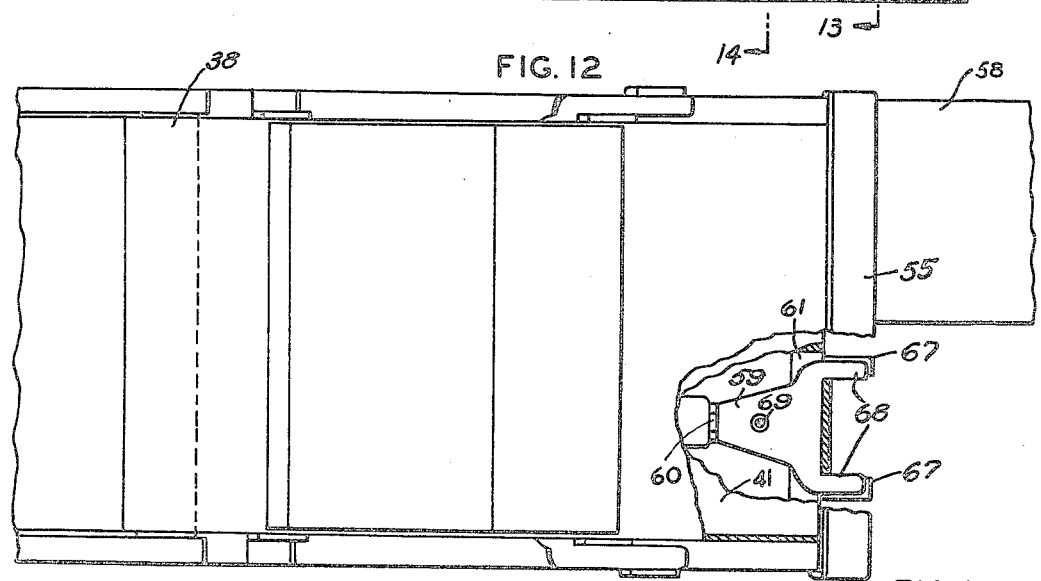
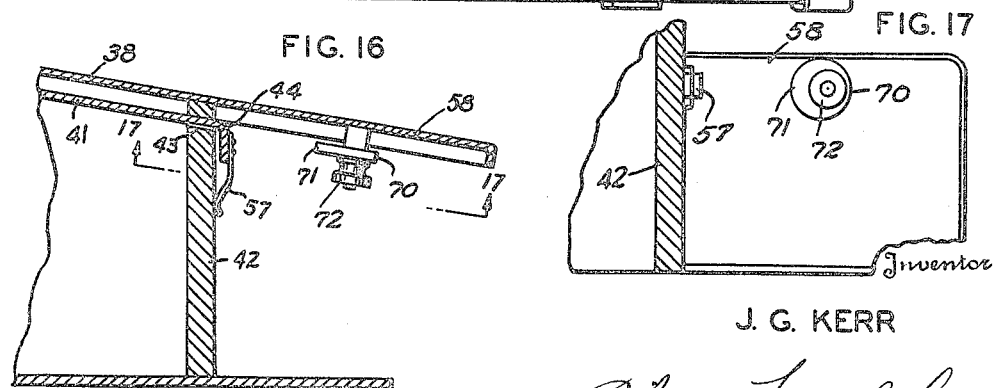
J. G. KERR July 4, 1950            J. G. KERR            2,514,077

FANFOLD MANIFOLDING DEVICE

Filed Oct. 15, 1945            6 Sheets-Sheet 4

Inventor

J. G. KERR

By Mason Fenwick & Lawrence

Attorneys

July 4, 1950  J. G. KERR  2,514,077
FANFOLD MANIFOLDING DEVICE
Filed Oct. 15, 1945  6 Sheets-Sheet 5
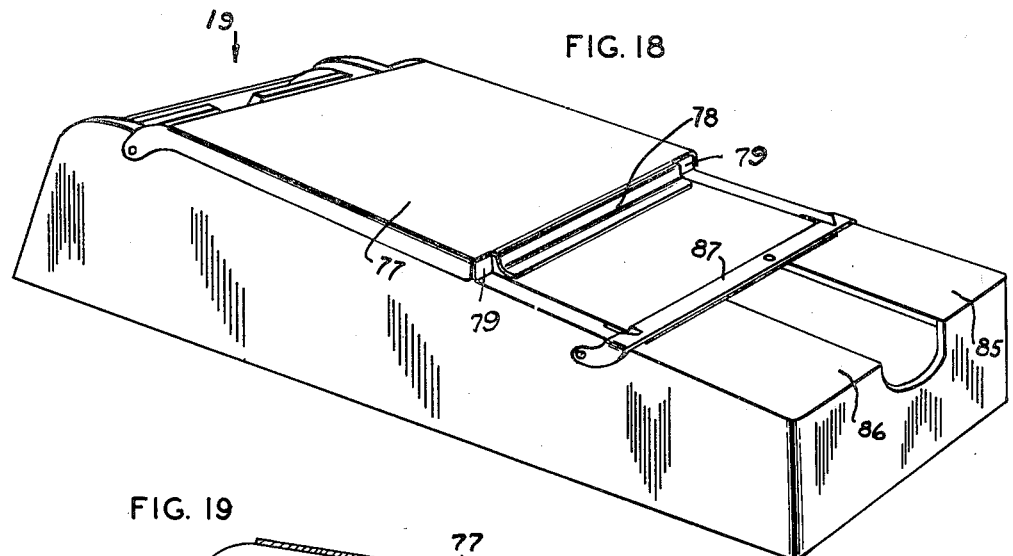
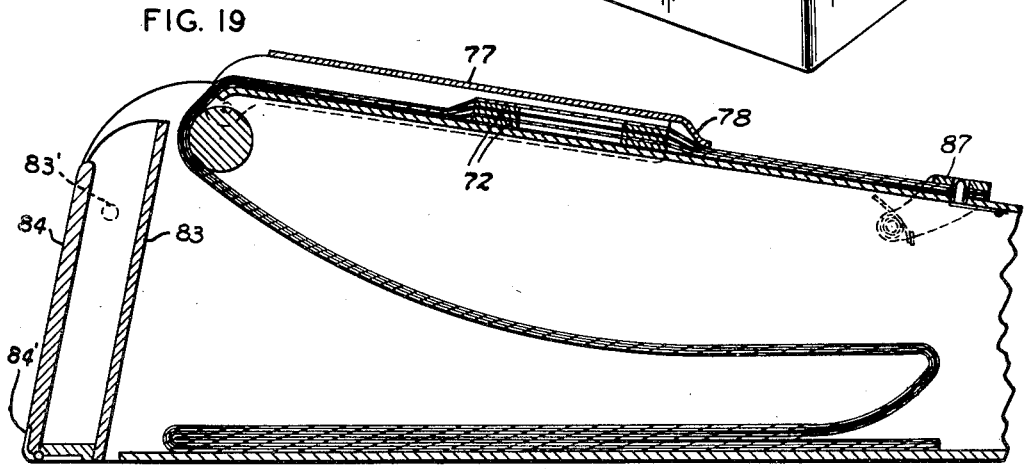
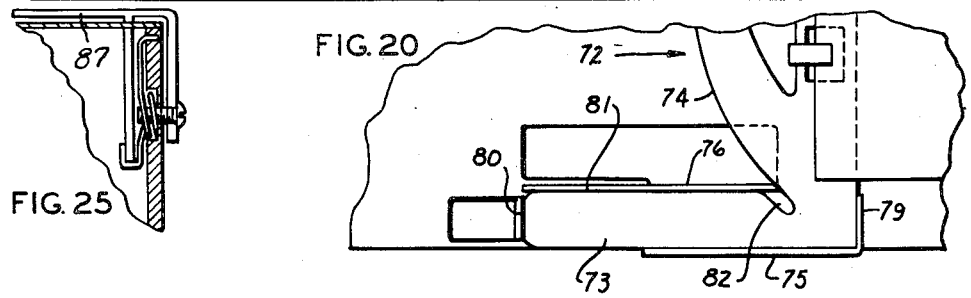
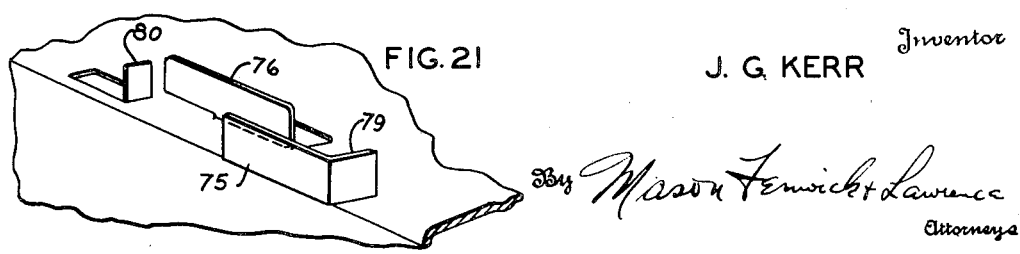
J. G. KERR Inventor
By Mason Fenwick & Lawrence
Attorneys July 4, 1950  J. G. KERR  2,514,077
FANFOLD MANIFOLDING DEVICE
Filed Oct. 15, 1945  6 Sheets-Sheet 6
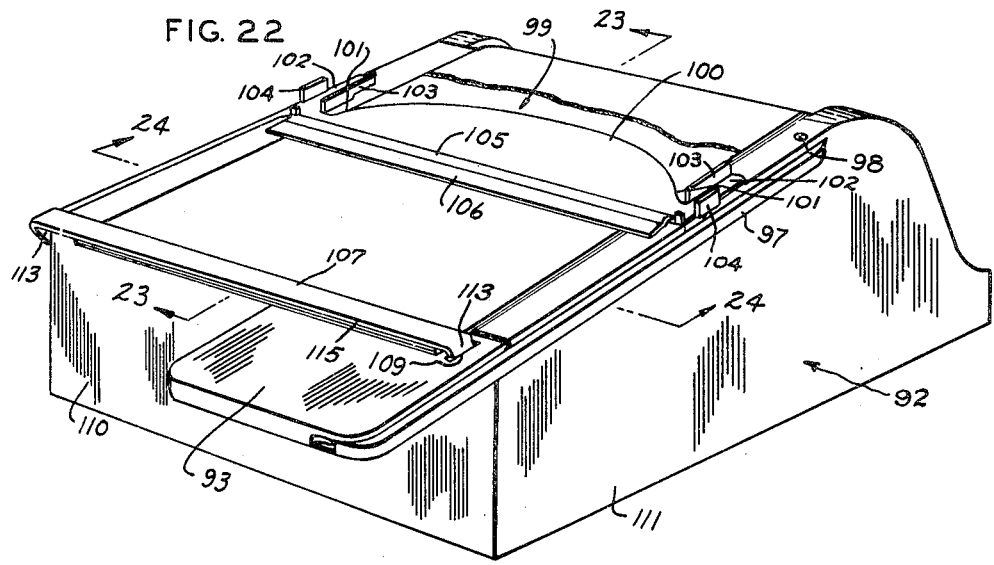
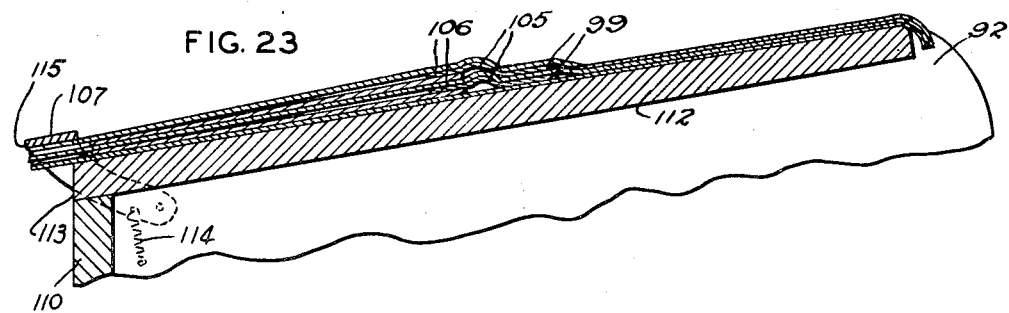
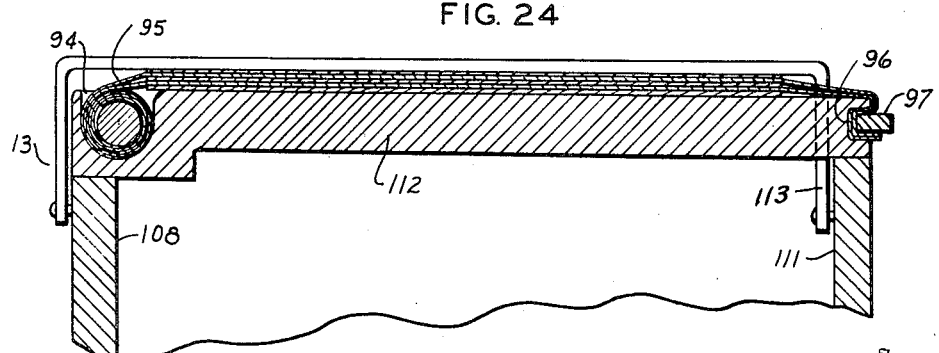
J. G. KERR, Inventor Patented July 4, 1950

2,514,077

UNITED STATES PATENT OFFICE 2,514,077

FANFOLD MANIFOLDING DEVICE

James Gordon Kerr, Millburn, N. J.

Application October 15, 1945, Serial No. 622,471

8 Claims. (Cl. 282—3)

This invention relates to manifolding machines of the type particularly adapted to employ manifolding sheaves of the fanfold type.

The fanfold sheaf comprises a sheet of paper of indeterminate length, folded longitudinally in zigzag fashion, if folded more than once, so as to provide a strip consisting of a plurality of superposed leaves longitudinally joined. This strip is folded transversely in zigzag fashion, to form a bundle of sequentially joined portions of equal length, convenient for insertion into a magazine. Since, as will appear, the present invention contemplates the tearing off of equal portions successively from the advance end of the sheaf, it is preferred to make the transverse folds a distance apart equal to an exact plurality of the length of the forms or parts to be torn off, so as to prevent a fold appearing across the face of one of the severed portions.

The general object of the invention is to provide a manifolding machine which shall include a magazine for holding the supply bundle, a substantially flat supporting table upon which the anterior portion of the fanfold sheaf is extended, and over which it is drawn, said table including a writing area, the machine also including slitting means back of the writing area for slitting the sheaf along one or mode of the longitudinal folds before it gets to the writing area, said slitting means also supporting carbon sheets interleaved between certain of the leaves of said sheaf, and extending into the writing area, a knife bar providing a straight edge in front of the writing area against which the manifolded forms are torn off, preferably a hand rest in front of the knife bar, provisions permitting the convenient and sure grasping of the advance end of the sheaf for drawing it out to the line at which it is to be torn off, and preferably, means for automatically determining the stopping point to which the sheaf should be drawn.

In the absence of automatic stopping point determining means, the fanfold sheaf is printed or otherwise provided with indicia indicating the length of the forms. This may be omitted where the automatic stop determining means is present.

More specific objects of the invention include:

(a) A separator interposed between the leaves of the fanfold, having one or more of the following features:

A convex forwardly extending separating portion with its peak occurring at an intermediate point in the width of the separator for entering the transverse folds adjacent their middle, opening them and progressively flattening them from the middle toward the ends as the fanfold sheaf is drawn toward the separator.

Slitting edges at the base of the separating portion for slitting the longitudinal folds of the sheaf, the separating portion cooperating to guide the open fold flat to the slitting edges.

A carbon sheet supporting bar having holes for receiving the ends of the carbon paper attaching clips, and the positions of the clips and clip receiving holes being laterally staggered in adjacent correlated separators so as to minimize the thickness of the group of superposed separators in the sheaf.

The separator, including any one or more of the above features, having side arms, and spaced lugs on the body of the machine between which the side arms seat and by means of which the separators are accurately positioned.

(b) The shearing edge of the knife bar being intact throughout its length without the indentation customarily provided to permit grasping of the ends of the sheaf, and which is apt to produce "tabbing" of the form when the form is torn off, usually requiring that the sheaf be formed with lines of perforations between the forms, to prevent such "tabbing," which perforations are unnecessary in the present invention.

Compensating for the absence of the indentation by having the knife bar overhanging the front of the machine and limiting the width of the hand rest to less than that of the fanfold sheaf, the knife bar being swingable upwardly from the surface of the paper, to give access to the end of the sheaf for purpose of grasping, or alternatively Providing a spring retrieved forwardly movable knife bar which can be grasped together with the end of the sheaf and drawn out more or less, and which returns automatically to normal position when retrieved, leaving the paper exposed.

In the case of short forms providing a definite extent of forward movement of the knife bar equal to the length of the form whereby the knife bar and sheaf are drawn out together to the limit of movement of the knife bar, and the latter released, the form is in the precise position to be torn off.

(c) The provision of a series of longitudinally aligned holes through the sheaf, spaced at distances equal to the length of the form, and a retractable pin on the machine, spring-projectible into the path of the sheaf, against which the under side of the sheaf moves, positioned to enter the holes successively as the paper is drawn out, functioning as an automatic stop, to determine the precise length of form to be torn off.

The mounting of the spring projectible pin on a carrier, movable with the forwardly moving knife bar, the pin being registrable with a hole in the knife bar, and thus serving as a positive coupling between the sheaf and knife bar as the two are drawn out together, released when the knife bar is released.

The provision of fanfold sheaves punched with holes, as described.

(d) The provision of a liftable cover overlying the region of the fanfold sheaf in which the separators are inserted, yieldably bearing upon the sheaf so as to restrain the separators from undue rising, and to keep the leaves flat over the writing area, free from "air pockets," for better manifolding.

Other objects of the invention will appear as the following description of several embodiments of the invention proceeds.

In the drawings which accompany and form a part of the following specification and throughout the several figures of which the same reference characters have been used to denote identical parts:

Figure 1 is a perspective view of one form of machine exemplifying features embraced in the inventive concept;

Figure 2 is a plan view partly broken away and partly in section;

Figure 3 is a view in section, taken along the line 3—3 of Figure 2;

Figure 4 is an enlarged vertical longitudinal section through the fanfold sheaf and adjacent parts of the machine throughout the region occupied by the slitters and carbon sheets;

Figure 5 is a cross-section taken along the line 5—5 of Figure 4;

Figure 6 is a plan view of a separator for slitting either right or left folds when the fold is inset from the margin of the sheaf;

Figure 7 is a plan view of a separator used when the side fold is to be left intact;

Figure 8 is a cross-section taken along the line 8—8 of Figure 6;

Figure 9 is a perspective view illustrating a fanfold sheaf;

Figure 10 is a cross-section of a form of fanfold sheaf;

Figure 11 is a side sectional view through another form of manifolding machine, parts being broken away;

Figure 12 is a plan view of the machine shown in Figure 11, partly broken away and partly in section;

Figure 16 is a fragmentary view in vertical longitudinal section taken along the line 16—16 of Figure 17;

Figure 17 is a fragmentary bottom plan view of the hand rest showing the adjustable stop;

Figure 18 is a perspective view of still another form of the invention;

Figure 19 is a longitudinal vertical section through the same, taken along line 19—19 of Figure 18;

Figure 20 is a fragmentary plan view showing one side of the slitter and the seat for the side arm thereof;

Figure 21 is a perspective view showing details of the construction and arrangement of the seating lugs;

Figure 22 is a perspective view of another form of manifolding machine, the upper leaf of the fanfold sheaf being broken away to reveal the underlying slitter;

Figure 23 is a longitudinal vertical section taken along the line 23—23 of Figure 22;

Figure 24 is a transverse vertical section taken along the line 24—24 of Figure 22;

Figure 25 is a detail view in section of the spring mounting of the hinged knife bar.

Figure 13:
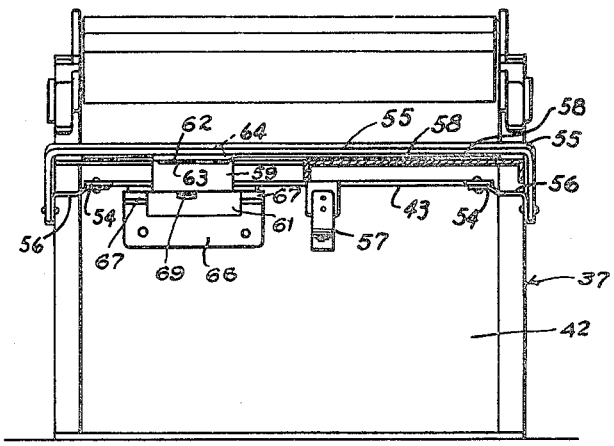
Figure 13 is a vertical cross-section taken along the line 13—13 of Figure 11.
Figure 14:
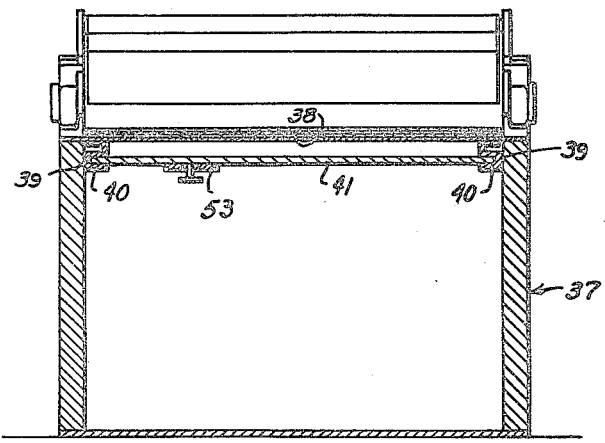
Figure 14 is a vertical cross-section taken along the line 14—14 of Figure 11.
Figure 15:
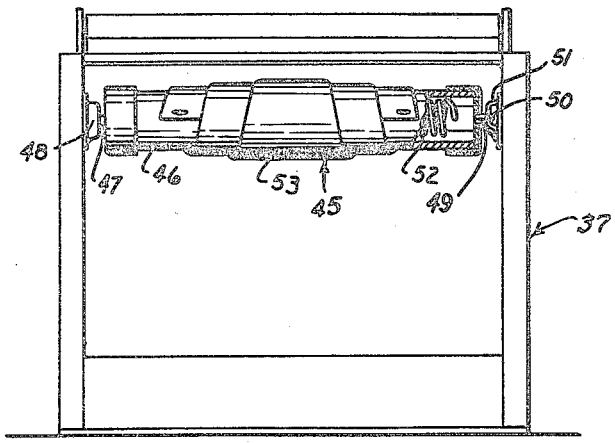
Figure 15 is a rear elevation of the machine shown in Figure 12.

Referring now in detail to the manifolding machine illustrated in Figures 1 to 8, inclusive, it consists of a portable box 1, having a bottom 2, similar opposite side walls 3, a front wall 4, extending the full height of the box, and a back wall 5, which is shallow so that the rear of the box is open, the chamber within the box being a magazine. The upper edges of the opposite sides lie in a plane which inclines downwardly in a forward direction at a convenient writing angle.

The box has a top plate 6, resting upon the side walls 3 and secured thereto. The major portion of the top plate is flat both in a transverse and longitudinal direction, and forms a table 7, which supports the extended portion of the fanfold sheaf. A direction changing roller 8 bridges the open rear of the box 1, adjacent the rear end of the top plate 6.

A hand rest 9 is secured forwardly of the table 7, and front wall 4, the upper surface of which is in the same plane as the table 7. The hand rest is at one side of the front of the box, and extends over only part the width of the table. A transverse knife bar 10 is hingedly mounted on the sides of the box, and extends across the front in overhanging relation to the front wall 4, and forward end of the table 7. It normally lies upon the hand rest 9, urged by the spring 11. The front edge of the knife bar is a continuous shearing edge extending the full width of the table 7.

A leaf spring 12 is secured at one end to the under side of the hand rest 9. A pin 13 is mounted on the free end of the spring and projects upward through a hole in the hand rest and into an aligned hole 14 in the knife bar. The spring 12 is sufficiently delicate to permit the paper when passing over the pin 13 to depress it below the plane of the paper.

After the fanfold bundle 15 is placed in the magazine, the free end portion is passed about the roller 8, as indicated in Figure 3, and then extended in substantially flat position along the table 7, and beneath the knife bar 10, which is raised to the broken line position shown in Figure 3, to permit the easy insertion of the fanfold sheaf between said knife bar and the underlying portion of the table 7.

It will be observed from Figure 9 that the fanfold sheaf is punched with a longitudinal series of holes 16 spaced apart at distances equal to the length of the form to be torn off. The fanfold sheaf is drawn beneath the knife bar 10 and over the pin 13, until the foremost hole 16 registers with the pin, whereupon, the latter springs up into the hole 16 and the fanfold sheaf is properly positioned in the machine.

The top plate 6 is formed at the rear with the upstanding lugs 17, which lie close to the lateral edges of the fanfold sheaf and act as guides for the same. The knife bar 10 is provided with the guiding tongues 18, spaced apart a distance equal to the width of the sheaf, the free ends of which extend into slots 19 in the table, and which are of sufficient length to remain in said slots when the knife bar is elevated. Thus, the longitudinal movement of the fanfold sheaf is accurately guided, even when the knife bar is raised and its pressure upon the fanfold sheaf released, so that the holes 16 come into operative alignment with the pin 13.

When it is desired to tear off a form, the knife bar 10 is lifted by means of the laterally extending fingerpiece 20, exposing the forward edge of the sheaf, which overhangs the front of the table 7. The forward edge of the sheaf is then grasped, lifted off of the pin 13 and the knife bar released. The sheaf is then drawn out until the pin 13 automatically enters the next succeeding hole 16. Light pressure of the hand is applied to the knife bar 10, and the form torn off against the shearing edge 21 of the knife bar. This can also be accomplished by raising the knife bar near its middle, together with the forward end of the fanfold sheaf which underlies it, thus loosening the forward end of the sheaf from the pin 13, and lifting the knife bar in a one hand motion.

At an intermediate point in its length, the top plate 6 is provided with a transversely opposite pair of upstanding lugs 22, close to the sides of the fanfold sheaf, and another pair of adjacent upstanding lugs 23 outwardly offset from the lugs 22. The pairs of lugs 22, 23 form seating means for the separator which may be of the type shown in Figures 2, 6 or 7.

Referring now to Figure 6, the separator which may be made of thin metal, plastic or vulcanized fiber, comprises the parallel side arms 25 adapted to seat neatly between the lugs 22 and 23. A transverse carbon bar 26 extends between the side arms. The carbon sheet 27 is secured to the carbon bar by means of the spring clips 28. In order to minimize the thickness of the separator and carbon bar assembly in the fanfold sheaf, the carbon bar is formed with holes or depressions 29, receiving the ends of the spring clips 28, as shown in detail in Figure 8. Where two or more separators with carbon bars are assembled in superposed relation, it is preferred to have the clips and depressions laterally staggered so that adjacent clips will not lie one above the other.

The carbon bar 26 is circumscribed by the convex portion 30, having its peak 31 intermediate the sides of the separator, and having its curvature merging smoothly into the preferably rectilinear slitting edges 32, adjacent the base of the convex portion at opposite sides. That form of the separator shown in Figure 6 is designed to to open either a right or left fold of the fanfold sheaf. Since it is desirable in some instances to eject forms having two or more leaves held together with an unsevered side fold, the separator 33, shown in Figure 7, is provided. The principle of construction of this separator is the same as that shown in Figure 6, excepting that it is laterally asymmetrical, the side 34 being shortened so as not to extend to the adjacent fold. This necessitates that the side arm 25 on the shortened side be omitted. The other side extends through the open side of the sheaf and does not have a slitting function. The separator 88, shown in Figure 2, is similar to the separator 24, illustrated in Figure 6, except that the slitting edges 89 are spaced farther apart to slit either the right or left longitudinal fold at the lateral edge of the sheaf.

It will, of course, be understood that in initially loading the machine with the fanfold sheaf, the folds which are to be cut by the slitters must be opened manually, beginning at the free end, and extending to a point beyond the separators when the forward end of the sheaf is operatively secured beneath the knife bar by the pin 13. Before the end of the sheaf is so secured, the separators are inserted between the proper leaves, one at a time, the side arms 25 being seated between the lugs 22 and 23.

When the separators are in this position, the carbon sheets occupy that area of the table 7 which constitutes the writing surface. A cover 34 is hingedly mounted in the guiding lugs 17, and is of such length as to overlie the separators. The forward end of the cover 34 is down-bent to form a flange 35, best shown in Figure 4, which rests gravitationally upon the interleaved carbon sheets and fanfold leaves and holds them flat over the writing area.

It is obvious that the separators, and including the carbon sheets, are subject to considerable frictional pull when the fanfold sheaf is drawn forwardly. If there is any freedom of movement of the side arms 25 betwen the seating lugs 22 and 23, this frictional pull may cause the separators to cant in one or the other direction, so that the carbon sheets may angle out through a slit fold, or crease up against an unslit fold. In either case, part of the writing area may be left bare of an underlying carbon sheet. This tendency of the separator to cant is much greater in the case of that form shown in Figure 7, wherein the shortened side 34 has solely cantilever support afforded by the single side arm 25. In order to prevent the canting movement of the separators, the lugs 23 are provided with slots 36 at their base, permitting the said lugs to be adjusted by bending them with a pair of pliers, so as to press against the side arm 25 and raise the opposite end of the separator.

The function of the convex portions 31 of the separators can best be understood following a brief description of the structure of the fanfold sheaf.

The longitudinally folded sheet is formed with very light lines of cross perforations just sufficient to permit accurate transverse folding. The transverse folds consist of several plies of paper, the inner plies being forcibly compressed by the resistance of the outer plies. During periods of storage of the folded pack, the transverse folds acquire an appreciable set. These factors contribute to creating a condition at the transverse folds in which the several plies tend to adhere frictionally and to resist opening flat as the fanfold sheaf is drawn over the direction changing roller. Furthermore, the intersection of the transverse folds with the longitudinal folds forms a tight polyhedral angle in the folded sheaf, contributing resistance to the full opening of the transverse folds in those regions adjacent the longitudinal folds. Known forms of separators have a more or less pointed projection having the slitting cam on its outer side, which projection pushes into the transverse fold in the very region in which its resistance to opening flat is greatest, with the result that frequently the projection tears into the fold and snarls the working of the device, requiring that it be re-loaded.

In the present invention, the convex peak of the separator which lies well in advance of the slitting edges first attacks the transverse fold toward the middle, where its resistance to opening is minimum, and separates and flattens the several plies. The convex shape of the advance end of the separator causes it to move laterally along the transverse fold as the sheaf is drawn forward, progressively flattening the fold until the slitting edges are reached.

Adverting now to the group of Figures 11 to 17, inclusive, these illustrate the principle of the sliding knife bar as a means for effecting the forward movement of the sheaf and precisely gauging the length to be torn off.

In this form of the invention, the box or cabinet 37 and the top plate 38 are substantially similar to their counterparts shown in Figures 1 and 2. The under side of the top plate 38 is provided with longitudinal rails 39 (see Figure 14), having guiding slots 40 for a sliding plate 41.

The front wall 42 of the box is provided with a transverse slot 43, through which the sliding plate extends. Said plate has the down-bent flange 44, Figure 16, which abuts the front wall 42 and limits the inward movement of the sliding plate 41.

The sliding plate is returned by means of a spring retriever 45, which takes the place of the roller 8, shown in Figure 3, and functions as a direction changer for the fanfold sheaf, as well as a retriever for the sliding plate. It comprises a hollow roller 46, Figure 15, having a pintle 47 at one end, journaled in a bearing 48, fixed to one of the side walls of the box, and journaled on the cylindrical portion 49 of a non-round lug 50, removably but nonrotatably anchored in a socket 51, fixed to the opposite side wall of the box. Within the roller 46 is a coil spring 52, one end of which is anchored to the roller, and the other end to the lug 50. The construction of the retriever, as shown, is similar to that of an ordinary shade roller. A web of flexible material 53 is secured to the roller 46, and normally winds thereupon under the urge of the spring 52. The web 53 is attached to the sliding plate 41, and automatically returns it to repose position after it has been drawn forwardly and released. A shock obsorbing spring 57 is secured to the down-bent flange 44 and yieldingly impinges against the front wall 42 before the flange 44 engages it, preventing jar on the return movement of the sliding plate.

The front end of the sliding plate 41 is provided at its lateral extremities with the forwardly projecting lugs 54, to which the knife bar 55 is secured, preferably through the intermediary of the leaf springs 56. These springs give the knife bar some slight yield in a vertical direction, to permit depression of the knife bar against the sheaf when the latter is torn off, and adjustments of necessary clearance.

The hand rest 58, which extends forwardly of the front wall 42, preferably occupies not more than half of the space in front of the knife bar and is arranged toward one side of the machine. A pin carrier 59 is hingedly mounted on the under side of the sliding plate 41, along a horizontal axis represented by the reference numeral 60. Its forward end projects through a slot 61 in the front wall 42, laterally of the space occupied by the hand rest. The forward end of the pin carrier is upturned and formed with a flange 62, contiguous to the under side of the knife bar 55. A leaf spring 63, Figure 13, is fixed to the under side of the flange 62, and carries a pin 64 at its free end, which projects through a hole in the flange 62 and into a registering hole 65, in the knife bar. A cam bar 66 is fixed to the front wall 42, beneath the slot 61, and has spaced upstanding cams 67, engaged by corresponding lugs 68, projecting from the pin carriage when the sliding plate is in retracted position, to hold the flange 62 in elevated position contiguous to the knife bar. The space between the upstanding cams 67 permits the pin carriage to drop when the knife bar and sliding plate 41 are pulled out sufficiently to cause the lugs 68 to separate from the cams 67. The extent of drop of the pin carriage 59 is limited by a headed pin 69, the shank of which passes through a hole in the pin carriage and is attached to the sliding plate.

When the fanfold sheaf is first assembled in the machine, the forward end is inserted beneath the knife bar. To facilitate insertion, the knife bar is preferably drawn out sufficiently to cause the pin carriage 59 to drop, moving the pin 62 out of the path of the paper. The knife bar is then released to repose position. The pin 62 is then bearing against the under side of the paper under the urge of the light leaf spring 63. The sheet is then drawn out until the pin 62 enters the first of the holes 16. Then any projecting portion of the sheaf is torn off against the forward or shearing edge of the knife bar, and the machine is ready for operation.

The technique of operating the machine for a short form may differ slightly from that employed for a long form. In the case of a short form, a stop 70 may be provided. As shown, this is mounted on the under side of the hand rest in a position to be engaged by the down-bent flange 44 of the sliding plate. The proximate end 71 of the stop is at a distance from the down-bent flange 44, precisely equal to the length of the form to be torn off. The knife bar 55 and flange 62 of the pin carriage are grasped together and pulled out until the movement is arrested by the stop 70. This carries the pin carriage beyond the restraint of the cams 67. The grasping pressure is then released, which causes the pin carriage to drop, withdrawing the pin 62 from the hole 16 in the paper, and simultaneously permitting the sliding plate 41 to retract, bringing the knife bar 55 and pin carriage back into repose position, automatically inserting the pin 62 into the next hole 16 of the sheaf. The paper form is thus left exposed, ready to be torn off against the shearing edge of the knife bar. The stop 70 is preferably eccentrically mounted and rotatably adjustable by means of the thumb nut 72, so that the movement of the knife bar can be precisely adjusted to the length of the form.

Now, in the case of a long form, the same procedure could be followed, but it would require a hand rest at least as long as the form, to provide for the mounting of the stop 70 at the proper distance from the down-bent flange 44. The relatively short hand rest is therefore retained with the stop located at a distance from the down-bent flange less than the length of the long form. The knife bar and flange 62 of the pin carriage are grasped together and pulled out until movement is arrested by the stop 70. Then the parts are released, as in the case of the short form, leaving a length of paper exposed. However, since the holes 16 are farther apart, the pin 62 will not enter the next hole 16. The operator grasps the sheaf with one hand and the knife bar with the other and draws it out independently of the knife bar until the pin enters the next hole 16, at which time the portion of the sheaf drawn beyond the shearing edge of the knife bar is precisely the length of the form which is to be detached.

Figures 18 to 21 show another modification of the invention, in which the principal variation from the form shown in Figure 1 results from the use of the new species of separator 72, disclosed in Figure 20.

This differs from the separators shown in Figures 6 and 7, in that the side arms 73, only one of which is shown, extend forwardly beyond the convex fold opening and flattening portion 74, instead of rearwardly, laterally of the carbon sheets.

The forward arrangement of the side arm 73 places the apex of the convex portion 74 within the boundaries of the base of support of the separator defined by said side arms, and causes it to hug the underlying ply of paper as it approaches the line of fold, reducing its tendency to rise upon the slope of the underlying ply as the line of fold is approached.

The forward arrangement of the side arms 73 requires a re-positioning of the seating lugs 22 and 23, shown in Figures 1 and 2. In these figures said lugs are located laterally of the writing area and not in position to enclose the lugs beneath the hinged cover, for the latter would in such case, conceal and obliterate an appreciable part of the writing area. In the construction shown in Figures 18 to 21, the seating lugs 75 and 76 are positioned posterior to the writing area and are enclosed within the hinged cover 77. This shields the lugs from becoming caught by the clothing of the operator, with the possible result of the machine being pulled off the desk and onto the floor, or other damage to the lugs by bending. The cover 77 has the downward directed front flange 78 of such depth as to cause the weight of the cover to bear upon the sheaf at the top of the writing area.

In the form of the invention shown in Figure 1, the lower lug 23 was made bendable inwardly by the provision of the slot 36, to bear against the arm 25, in order to tilt the free end of the separator shown in Figure 7 upwardly to counteract the downward drag upon said separator, produced by the forward movement of the sheaf. In the form of invention disclosed in Figures 18 to 20, the same object is achieved by forming a base slot in the upper lug, making it adjustably bendable outwardly against the side arm.

It will be noted both with respect to Figures 1 and 20 that the unbendable lugs 22 and 75, respectively, terminate short of the bendable portion of the respective lugs 23 and 76. This leaves a free space opposite the bendable portions, so that if the side arms happen to be a loose fit between the lugs, they may be tilted, if necessary, into this free space to obtain transverse alignment of the carbon bar.

In the embodiment shown in Figures 18 to 20, additional transverse lugs 79 and 80 are provided, the one abutting the base of the carbon bar, and the other the free end of the side arm. Thus, longitudinal displacement of the separators in either direction is prevented.

Figure 20 shows that the inner edge 81 of the side arm 73 does not meet the slitting edge 91 substantially at the point of slitting. Instead, the contour of the side arm adjacent the point at which it joins the slitting edge is such as to form a recess 82, extending outwardly from the line of the longitudinal fold, making room for the outward spread of the paper incident to the rupturing stress of the slitting edge.

The machine shown in Figures 18 to 21 provides a compartment 83, taking the place of the rear wall 84b in the other modifications in which severed forms may for convenience be stored or collected. This compartment is hinged, as indicated at 84', permitting it to be turned down to give access to the cabinet for replenishing the fanfold peak. A detent 83' holds the compartment 83 in normal upright position.

Two hand rests 85 and 86 are also provided, making the machine versatile for right or left-handed people, said hand rests being spaced apart to expose a central gripping area of the knife bar 87. This provides a centralized one-handed pull, and may enhance smoothness and speed in the operation of the device.

In that form of the invention illustrated in Figures 22 to 24, inclusive, the separators are entirely divorced from their function as carbon sheet holders, since the carbon paper is fed transversely through the sheaf. The box or cabinet 92 is of the same general shape as the cabinets illustrated in the previously described devices, forming a magazine for the fanfold bundle, a direction changing roller, (not shown), being provided, over which the fanfold sheaf is drawn out over a flat top face sloping downward toward the front of the cabinet.

In this instance the top plate 112 is a relatively thick member having the integral narrow hand rest 93, projecting beyond the front of the cabinet. The top plate 112 is formed with a longitudinal recess 94, at one side outside the path of transverse of the sheaf and laterally of the writing area. This receives a roll 95, consisting of a cylindrical spool, in which are wound in parallel, a plurality of long strips of carbon paper. The width of these carbon strips is substantially coextensive with the writing area of the top plate. The free end portions of the carbon sheets are interleaved with the leaves of the fanfold sheaf and then bent over the opposite side of the top plate. This has a longitudinal slot 96, which extends through the side of the hand rest, and a locking bar 97, hinged at the rear of the cabinet at 98, cooperates with said slot for clamping the free ends of the carbon strip in said slot. When the carbons in said writing area become depleted, the bar 97 may be released from the slot 96, the carbon strips pulled through to present a fresh portion of the carbon strips in the writing area, the carbon strips reclamped in the slot by the locking bar 97, and the extending portions torn off against the locking bar.

Since all of the folds of the fanfold sheaf must be slit to pass the carbon strips, all of the separators have the slitting function. If it is desired to eject a form having two leaves attached by a fold, then the carbon strip must be omitted from between the leaves forming said fold and no separator is needed between said leaves.

The separators 99 may be identical. Each is formed with the forwardly directed convex fold flattening portion 100, having slitting edges 101 at its base for severing right or lefthand folds, and side arms 102 seating between lugs 103 and 104 at opposite sides of the top plate. Since the top edge of each carbon strip is subject to the frictional drag of leaves of the fanfold sheaf, and particularly the transverse end folds in the same, and consequently susceptible of being torn, it is desirable to keep the contact of the said leaves with the edges of the carbons as free as possible. This is accomplished by providing the separator 99 with a transverse upwardly concave channel 105, which overlies the edge of the carbon sheet and the leaf associated therewith, relieving these contiguous elements of the pressure of the separator. The latter is formed with a terminal flange 106 below the channel 105, which contacts the carbon strip below the free edge, and maintains the sheaf and interleaved carbons in close contact in the writing area.

A liftable knife bar 107 is mounted forwardly of the front edge of the top plate 112, resting upon the hand rest 93 when in repose position. This has the downturned ends 113, one of which is hinged to the side 108 of the cabinet, while the other, in order not to interfere with the swinging movement of the locking bar 97, passes through a slot 108 in the hand rest and front wall 110 of the cabinet, and is pivoted to the side of the side wall 111. The fanfold sheaf extends beneath the knife bar, a spring 114 pressing the knife bar against said sheaf, and the form to be severed is torn off against the forward edge 115 of the knife bar, in the same manner as described with reference to the device illustrated in Figure 1.

In the form of invention disclosed in Figures 22 to 24, the fanfold sheaf is without the benefit of the indexing punching 16 shown in the previously described modifications, so that the sheaf may have some indicia, such as printed or perforated line demarking the forms, as a guide to the eye in determining the precise extent to which the sheaf must be drawn out beyond the shearing edge of the knife bar.

While those forms of the invention employing the self registering feature of indexing holes in the sheaf registering with a pin on the device, are primarily designed for the fanfold single-web style of form construction, they can be used with a continuous separate strip sheaf, in which a plurality of strips are guided in lateral alignment by guides at the sides of the sheaf, and maintained in longitudinal registery by coincident punched holes through the strips, synchronized with the printing, and engageable with the pin.

While I have in the above description disclosed what I believe to be several practical embodiments of the invention, it will be understood to those skilled in the art that the inventive concept which pervades these forms is capable of embodiment in other constructions.

What I claim as my invention is:

1. In a manifolding device of that type in which a plural ply sheaf of manifolding paper in long strip form is contained, in the form of a supply bundle congruently folded transversely in zigzag fashion, and from which bundle the free end of said sheaf is drawn out over a flat surface including a writing area over which carbon paper sheets are spread in interleaved relation to the plies of said sheaf, in combination with such device, a separator comprising a flat member interposed between adjacent plies, positioned on said flat surface in advance of said writing area, having a laterally located slitting edge, and a leading convex edge with its peak occurring substantially midway of the width of said sheaf and forward of said slitting edge for opening and flattening the transverse folds as they are drawn into contract with said leading edge.

2. In a manifolding device of that type in which a plural ply sheaf of manifolding paper in long strip form is contained, in the form of a supply bundle congruently folded transversely in zigzag fashion, and from which bundle the free end of said sheaf is drawn out over a flat surface including a writing area over which carbon paper sheets are spread in interleaved relation to the plies of said sheaf, in combination with such device, a separator comprising a flat member interposed between adjacent plies, positioned on said flat surface in advance of said writing area, having means for holding a carbon sheet in said writing area and having a laterally located slitting edge and a forwardly directed convex edge in advance of said carbon sheet holding means, with its peak of convexity occurring substantially midway of the width of said sheaf and forward of said slitting edge, for opening and flattening the transverse folds as they are drawn out into contact with said convex edge.

3. In a manifolding device of that type in which a plural ply sheaf of manifolding paper in long strip form is contained formed of a single web folded longitudinally in zigzag manner, in the form of a supply bundle congruently folded transversely in zigzag fashion, and from which bundle the free end of said sheaf is drawn out over a flat surface which includes a writing area over which carbon sheets are spread in interleaved relation to the plies of said sheaf, in combination with such device, a separator comprising a flat member interposed between adjacent plies, positioned on said flat surface in advance of said writing area terminating adjacent its base on both sides in slitting edges, and having a leading convex edge of such width as to bridge the width of said sheaf, with its peak of convexity occurring substantially midway of the width of said sheaf and forward of said slitting edges for opening and flattening the transverse folds as they are drawn into contact with said leading edge.

4. Manifolding device comprising a receptacle for a plural ply sheaf of manifolding paper in long strip form folded congruently transversely in zigzag fashion into a supply bundle, said receptacle having a flat top forming a slideway along which the free end portion of said sheaf is drawn from said bundle, the forward part of said slideway constituting a writing area in conjunction with a carbon sheet spread over said area interleaved with the plies of said sheaf, a separator comprising a flat member inserted between adjacent plies in advance of said writing area for opening and flattening the transverse folds of said sheaf, said separator having a longitudinal side arm outside the path of movement of said sheaf, and cooperating inner and outer lugs at each side of said receptacle outside the path of movement of said sheaf and extending above the plane of said slideway, defining between them a longitudinal seat for said side arm.

5. Manifolding device as claimed in claim 4, said lugs being longitudinally displaced, and one lug being bendable to press said side arm for adjusting the transverse alignment of said separator.

6. In a manifolding device of that type in which a plural ply sheaf of manifolding paper in long strip form is contained in the form of a supply bundle congruently folded transversely in zigzag fashion, and from which bundle the free end of said sheaf is drawn out over a flat surface including a writing area over which carbon sheets are spread in interleaved relation to the plies of said sheaf, in combination with such device, a separator comprising a substantially flat member interposed between adjacent plies, positioned on said flat surface in advance of said writing area, having a transverse carbon sheet holding portion, independent clips on said portion for clipping a carbon sheet, said portion having apertures into which the ends of said clips sink, for minimizing the thickness of said separator, the latter having a forwardly directed convex edge in advance of said carbon sheet holding portion, with its peak of convexity occurring substantially midway of the width of said sheaf for opening and flattening the transverse folds as they are drawn into contact with said edge.

7. Manifolding device as claimed in claim 6, including a plurality of said separators congruently arranged between different adjacent plies with the clips and apertures of adjacent separators laterally displaced.

8. Manifolding device comprising a receptacle for a plural ply sheaf of manifolding paper in long strip form folded congruently transversely in zigzag fashion into a supply bundle, said receptacle having a flat top forming a slideway along which the free end portion of said sheaf is drawn from said bundle, the forward part of said slideway constituting a writing area in conjunction with a carbon sheet spread over said area interleaved with the plies of said sheaf, separators, each comprising a flat member, inserted between adjacent plies in advance of said writing area for opening and flattening the transverse folds of said sheaf, said separators having longitudinal side arms beyond the path of movement of said sheaf, cooperating inner and outer lugs on said receptacle on each side, outside the path of movement of said sheaf and extending above the plane of said slideway, defining between them a longitudinal seat for the side arms of said separators, and a hinged cover overlying said separators and bearing upon said sheaf.

JAMES GORDON KERR.

REFERENCES CITED

The following references are of record in the file of this patent:

UNITED STATES PATENTS

| Number | Name | Date |
|---|---|---|
| 858,596 | Guertin | July 2, 1907 |
| 1,497,895 | Donnell et al. | June 17, 1924 |
| 1,534,478 | Wiswall | Apr. 21, 1925 |
| 1,622,415 | Burdell | Mar. 29, 1927 |
| 1,970,313 | Jensen | Aug. 14, 1934 |
| 2,091,089 | Winter | Aug. 24, 1937 |
| 2,163,990 | La Croix | June 27, 1939 |